United States Patent [19]

Cassel et al.

[11] Patent Number: 4,660,862
[45] Date of Patent: Apr. 28, 1987

[54] PIPE LAP JOINT WITH IMPROVED PULL-APART STRENGTH

[75] Inventors: Thomas R. Cassel; Scott T. Cassel, both of Birmingham, Mich.

[73] Assignee: BKS Company, Birmingham, Mich.

[21] Appl. No.: 719,268

[22] Filed: Apr. 2, 1985

[51] Int. Cl.⁴ ............................................. F16L 21/06
[52] U.S. Cl. ...................................... 285/114; 24/335; 24/279; 285/253; 285/420; 285/322
[58] Field of Search ............... 285/114, 115, 116, 301, 285/253, 420, 382, 322

[56] References Cited

U.S. PATENT DOCUMENTS

| | | | |
|---|---|---|---|
| 393,400 | 11/1888 | Sharpneck | 285/114 |
| 1,072,896 | 9/1913 | Albee | 285/114 |
| 1,204,650 | 11/1916 | Claflin | 285/114 |
| 1,346,330 | 7/1920 | Mitchell | 285/114 |
| 1,426,086 | 8/1922 | Lowrey | 285/114 |
| 1,505,255 | 8/1924 | Gold | 285/114 |
| 1,911,486 | 5/1933 | Bacheldor et al. | 285/114 |
| 2,835,954 | 5/1958 | Dahl | 24/279 |
| 3,004,781 | 10/1961 | Morris | 285/420 |
| 3,905,623 | 9/1975 | Cassel | 285/382 |
| 3,944,265 | 3/1976 | Hiemstra | 24/279 |
| 4,056,273 | 11/1977 | Cassel | 285/337 |
| 4,113,289 | 9/1978 | Wagner et al. | 285/322 |
| 4,261,600 | 4/1981 | Cassel | 285/177 |
| 4,312,526 | 1/1982 | Cassel | 285/419 |
| 4,502,189 | 3/1985 | Sieberkrob | 24/279 |

FOREIGN PATENT DOCUMENTS

| | | | |
|---|---|---|---|
| 268839 | 7/1964 | Australia | 285/114 |
| 121228 | 10/1978 | Japan | 285/115 |

Primary Examiner—Cornelius J. Husar
Assistant Examiner—Eric K. Nicholson
Attorney, Agent, or Firm—Reising, Ethington, Barnard, Perry & Milton

[57] ABSTRACT

A pipe coupling for improved pull-apart strength of pipe lap joints is disclosed. A clamping band is applied to the outside pipe around the overlap region of the pipes. An attachment is applied around the inside pipe and the two bands are connected together by a linkage extending alongside the pipes. Preferably, a sealing structure is provided on the outer pipe in the overlap region such that sealing engagement between the outside and inside pipes is obtained when the clamping band is tightened. When the pipes are subjected to pull-apart forces, the linkage resists slippage or pull-apart motion. If there is slippage, more will occur on the side opposite the linkage and an oblique relationship of the pipes results. This produces a binding action between the pipes with increased frictional resistance to the pull-apart forces.

7 Claims, 3 Drawing Figures

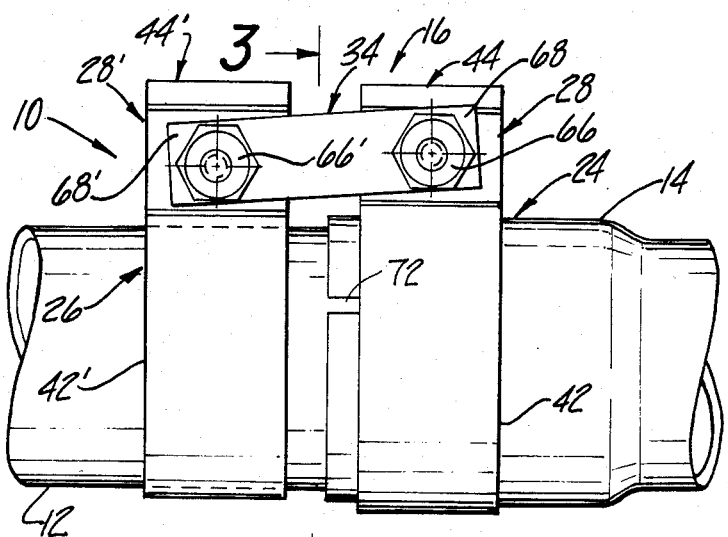
_Fig-1_
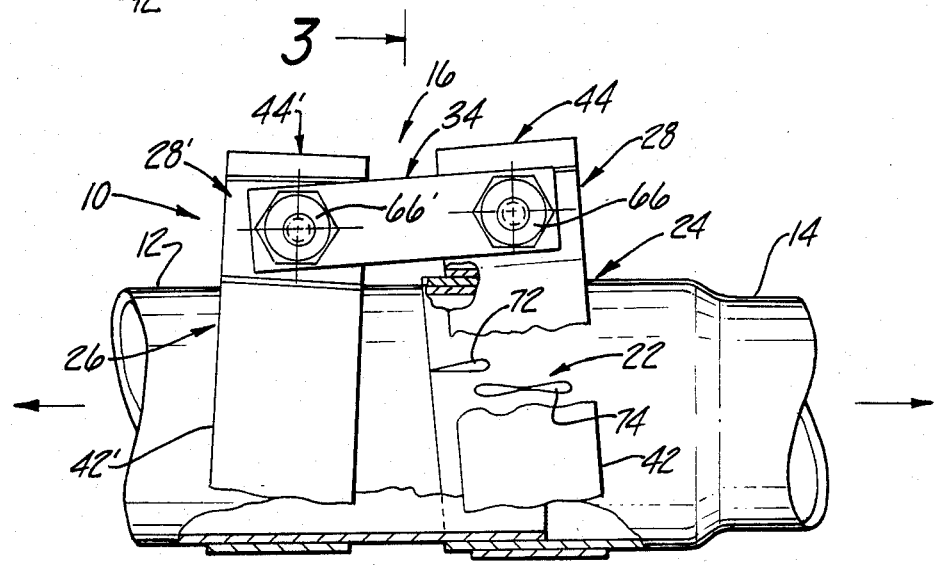
_Fig-2_
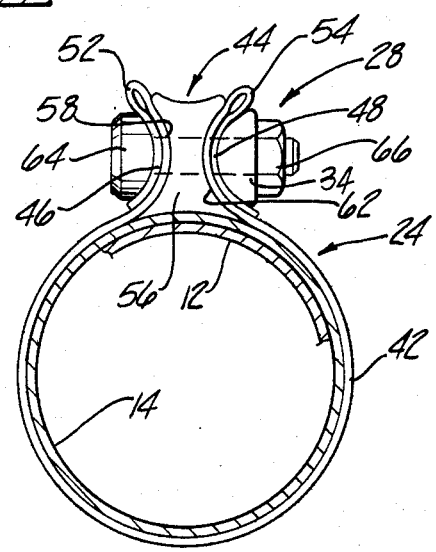
_Fig-3_

PIPE LAP JOINT WITH IMPROVED PULL-APART STRENGTH

FIELD OF THE INVENTION

This invention relates to pipe couplings and more particularly, it relates to a coupling with improved pull-apart strength for pipe lap joints.

BACKGROUND OF THE INVENTION

There are many applications for pipe couplings where it is desired to couple two pipes together with a very strong mechanical connection. An important use of such a coupling is that of joining two pipes in a vehicle exhaust system. In such an application, the pipe joint is exposed to a rugged environment including large temperature variations, roadway dirt, vibrations and forces acting on the pipes of the pipe joint. It is known that during vehicle operation forces are developed which have an axial component on the pipes which tends to pull the pipe joint apart. For this reason, the vehicle manufacturer usually establishes a specification of pull-apart strength which must be met by the exhaust pipe joints. Thus, the ability of the pipe joint to withstand axial forces without slippage or pull-apart movement is very important.

In certain applications in vehicle exhaust systems, it is desired to provide a pipe joint with a very high pull-apart strength and a good fluid seal between the pipes. This has been provided by a wide band clamp of the type in which the band is stretched over a butt joint with tight engagement against both pipes. This pipe coupling is disclosed in the Cassel U.S. Pat. No. 3,905,623 granted Sept. 16, 1975. This patent also discloses a lap joint in which the outer pipe serves as a clamping sleeve and receives the end of the other pipe in overlapping relationship. Force applying means are provided on the clamping sleeve to stretch the sleeve into tight engagement with the inner pipe.

A pipe coupling with a lap joint for exhaust systems with high pull-apart strength and good fluid sealing is also disclosed in the Cassel U.S. Pat. No. 4,056,273 granted Nov. 1, 1977. The coupling disclosed in this patent comprises a wide band clamp with a sealing ring disposed around the inner pipe and having an outer diameter about the same as that of the outer pipe. The wide band clamp covers the sealing ring and the end of the outer pipe, spanning the junction therebetween, and is stretched into tight engagement against the sealing ring and the outer pipe.

Another pipe coupling for lap joints with high pull-apart strength and good fluid sealing is disclosed in Cassel U.S. Pat. No. 4,312,526 granted Jan. 26, 1982. The coupling disclosed in this patent comprises an open sleeve which is stretched around the pipes. The open sleeve comprises a roundish sector and a channel-shaped sector comprising a pair of sidewalls extending radially outwardly from the roundish sector. Force applying means are connected with the sidewalls to draw them together so that the roundish sector of the sleeve is stretched over the pipes.

In certain applications in vehicle exhaust systems, it is desired to provide a pipe coupling of the lap type in which a fluid tight seal is provided with a clamping sleeve or band which engages the outer pipe only, i.e. which does not span the outer pipe and inner pipe. In such a pipe lap joint, the fluid seal is achieved by using an outer pipe with a collapsible sealing ring or zone at its free end which is collapsed into sealing engagement with the inner pipe by tightening a clamping band thereon. The pipe lap joint of this type is disclosed in the Wagner et al U.S. Pat. No. 4,113,289 granted Sept. 12, 1978. This type of lap joint is also disclosed in the aforementioned Cassel U.S. Pat. No. 4,056,273 wherein the collapsible sealing structure is separate from but forms an extension of the outer pipe.

There are applications in automotive exhaust systems in which the desired pull-apart strength cannot be achieved by clamping the end of the outer pipe against the inner pipe. In this type of joint, there is need for improvement to increase the pull-apart strength while retaining the sealing capability of the joint.

A general object of this invention is to overcome certain disadvantages of the prior art and to provide a pipe lap joint with improved pull-apart strength.

SUMMARY OF THE INVENTION

In accordance with this invention, an improved coupling is provided for a pipe lap joint which is easy to install and remove and is economical to manufacture. Further, it provides exceedingly high pull-apart strength and is especially suitable for use with joints having a collapsible sealing zone or ring at the end of the outer pipe.

Further, in accordance with this invention, an improved coupling is provided for pipe lap joints which comprises a band disposed around the outside pipe at the overlap region of the pipe ends with tightening means for clamping the band around the outside the pipe to clamp the pipes together. Attachment means is provided on the inside pipe beyond the overlap region and a linking means or bar is connected between said band and said attachment means whereby pull-apart motion of the pipe is resisted by the linking means which causes a binding action of the pipes and the band. Further, to provide a good fluid seal, the lap portion of the outer pipe is provided with a collapsible sealing zone or ring under the clamp band whereby it is engaged in sealing relation with the inner pipe. Further, the clamping band is an open loop with free ends extending radially outwardly and the tightening means comprises a bolt and nut through the free ends. Further, the clamping band has a cross-section with a roundish sector and a radially projecting channel-shaped sector. A spline having at least one concave surface is disposed in the channel sector and a linking bar is disposed on one side of the channel in opposition to the concave surface of the spline. The tightening means comprises a bolt and nut with the bolt extending through the sides of the channel, the spline and the linking bar. The linking bar is elongated and connects the clamp band to the attachment means. Preferably, the attachment means comprises an attachment band disposed around the inside pipe with tightening means to clamp it to the inside pipe. In this arrangement, the linking bar is utilized in the tightening means for both clamp bands.

A more complete understanding of this invention may be obtained from the detailed description that follows taken with the accompanying drawings.

DESCRIPTION OF THE DRAWINGS

FIG. 1 is an elevation view of the coupling of this invention after the coupling is tightened;

FIG. 2 is an elevation view of the coupling after it has been tightened and subjected to pull-apart forces; and FIG. 3 is a view taken on line 3—3 of FIG. 1.

BEST MODE FOR CARRYING OUT THE INVENTION

Referring now to the drawings, there is shown an illustrative embodiment of the invention in a pipe joint of the lap type which is especially adapted for use in vehicle exhaust systems. It will be appreciated as the description proceeds that the invention is useful in other embodiments and a wide variety of applications.

As shown in the drawings, the coupling 10 of this invention comprises, in general, inside and outside pipes 12 and 14, respectively, in a telescoping relationship with a compound clamp 16 for holding the pipes together. The inside pipe 12 has a lap portion which extends into the outside pipe 14 to provide an overlap region 18 of the pipes. In order to provide a fluid seal between the inside and outside pipes, a collapsible sealing zone or ring 22 is provided in the overlap region 18. This collapsible ring 22 will be described in greater detail subsequently.

The compound clamp 16 comprises a clamping band 24 and an attachment band 26 which are disposed around the outer pipe 14 and the inner pipe 12, respectively. The bands 24 and 26 are of the same construction except that they are of slightly different size to accommodate the sizes of the two pipes. The construction of the bands 24 and 26 will be described in greater detail subsequently. The clamping band 24 is provided with a tightening means 28 and the attachment band 26 is provided with a tightening means 28'. A linking means or bar 34 is connected between the clamping band 24 and the attachment band 26. The linking bar 34 has end portions which serve as a part of the tightening means 28 and 28', respectively. The tightening means 28 and 28' and the linking bar 34 will be described in greater detail subsequently.

As mentioned above, the bands 24 and 26 are of the same construction. For the sake of brevity, clamping band 24 will be described in detail with reference to FIGS. 1, 2 and 3 and the description will apply equally well to attachment band 26. For this purpose, the same reference numerals used in the description of clamping band 24 will be applied to corresponding parts of attachment band 26 with a prime symbol added to the reference numeral. The clamping band 24 is, for the most part, circular or roundish in cross-section. It has a roundish sector 42 adapted to fit around the pipe 14 and a channel-shaped sector 44 which comprises a pair of sidewalls 46 and 48 extending radially outwardly from the roundish sector. The clamping band 24 is made of a single piece of sheet metal and each free end thereof is folded back on itself to form a double layer. Thus, the sidewalls 46 and 48 are of double thickness and terminate at their outer ends in respective loops or bights 52 and 54 which serve as retaining members for holding the sidewalls in place when the tightening means 28 is tightened, as will be described subsequently.

The clamping band 24 is tightened around the pipe 14 by the tightening means 28. The tightening means 28 comprises a reaction member or spline 56 which is disposed within the channel-shaped sector 44 and which is adapted to seat upon the outer surface of the pipe 14. For this purpose, the spline has an inner surface of arcuate configuration conforming to the pipe 14. The spline 56 is provided with a pair of oppositely facing concave surfaces 58 and 62. The tightening means includes a bolt 64 and nut 66 and it also incorporates an end portion of the linking bar 34 as a part thereof. The linking bar 34 comprises a bar with one end 68 disposed outside the sidewall 48 and having a convex surface which is opposite the concave surface 62 of the spline 56. The bolt 64 has a head with a convex surface which is disposed outside the sidewall 46 opposite the concave surface 58 on the spline 56. The bolt extends through holes in the sidewalls 46 and 48, the spline 56 and the end 68 of the bar or linking bar 34.

The attachment band 26, as stated above, is of the same construction as the clamping band 24 except that the size is smaller to fit the inside pipe 12. The tightening means 28', being a part of the attachment band 26, is also of the same construction as the tightening means 28'. The tightening means 28' includes the other end of the linking bar 34 and thus the bar serves to connect or link the clamping band 24 with the attachment band 26. It is noted that the attachment band 26 constitutes an attachment means by which the clamping band 24 is coupled with or connected to the inside pipe 12.

As mentioned above, the outside pipe 14 is provided with a sealing ring 22 in the overlap region 18. While this sealing ring 22 may take a variety of forms, the illustrative embodiment takes the form of a collapsible structure to permit a ring-shaped portion of the wall of the outside pipe to be collapsed into engagement with the inside pipe when the clamping band 24 is tightened. This collapsible structure comprises a plurality of circumferentially spaced relief slots 72 which extend inwardly from the free end of the outside pipe. The collapsible structure of the sealing ring 22 also comprises a plurality of circumferentially spaced take-up slots 74 which are closed, i.e. do not extend to the end of the pipe.

When the compound coupling 10 is assembled and the bands 24 and 26 are tightened by tightening the nuts 66 and 66', the relationship of the parts is as shown in FIGS. 1 and 3. It will be understood that before the fastening means 28 and 28' are tightened, the sidewalls of the channel-shaped sector 44 and 44' are not seated against the respective splines. When the nuts 66 and 66' are tightened, the bolt heads and the respective ends of the bar 34 are drawn together and press the sidewalls 44 and 44' into seating engagement with the respective splines. When the nut 66' is tightened, the roundish sector 42' is stretched around the pipe 12 in tight engagement therewith. Similarly, when the nut 66 is tightened, the roundish sector 42 of the clamping band 24 is stretched around the outside pipe 14 over the sealing ring 22. This tightening of the clamping band 24 exerts sufficient force on the sealing ring 22 to crush or collapse the sealing ring such that the slots are partially closed with the sealing ring being radially collapsed into sealing engagement with the inside pipe 12.

When the coupling 10 is subjected to pull-apart forces, axial slippage or separation of the pipes 12 and 14 is resisted not only by the frictional engagement between the pipes but also by the linking relationship between the bands 24 and 26 through the linkage bar 34. If the pull-apart forces are great enough to produce some pull-apart motion of the pipes, a binding action occurs which imposes a higher degree of resistance to pull-apart motion. When the initial pull-apart motion does occur, the linking bar 34 holds the pipes 12 and 14 against any relative motion in the vicinity of the circumferential position of the linkage bar 34. However, it does permit some pull-apart motion to occur in the diametrically opposite vicinity; thus the pipes assume a canted relationship, i.e. pipes extend slightly obliquely relative to each other. This relationship is illustrated in FIG. 2 with some degree of exaggeration for purposes of explanation. With the pipes in the oblique relationship, there is an increased resistance to pull-apart motion because of the binding action and greatly increased frictional relationship between the pipes. Further, the bands 24 and 26 exhibit even greater resistance to displacement relative to the pipes by reason of the binding action on the pipes. Also, as the bands 24 and 26 assume a more oblique relationship, the bands tend to further elongate circumferentially creating greater tensile stress in the bands which develops greater pull-apart resistance. Consequently, the greater the pull-apart motion, the greater the pull-apart resistance.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A coupling having improved pull-apart strength of pipe lap joints of the type comprising:
    an inside pipe and an outside pipe in telescoping relationship with a lap portion at the end of the inside pipe disposed inside a lap portion at the end of the outside pipe to form an overlap region,
    a clamping band disposed around said outside pipe at said overlap region,
    tightening means for clamping the clamping band around the outside pipe to clamp the pipes together,
    attachment means on the inside pipe beyond the overlap region of the pipes,
    and linking means connected between said clamping band and said attachment means, the improvement wherein:
    said clamping band has a cross-section including a roundish sector and a radially projecting channel-shaped sector,
    said channel-shaped sector comprises a pair of sidewalls extending outwardly from the roundish sector and being separated from each other at the outer ends to form an opening in the clamping band,
    a spline disposed between the sidewalls and having a pair of surfaces which are respectively opposite said pair of sidewalls, one of said surfaces of said spline being concave,
    a bar disposed against one sidewall opposite said concave surface of the spline,
    said tightening means including at least one bolt and nut with the bolt extending laterally through the said bar, sidewalls and spline and being adapted to force the sidewalls against the respective surfaces of the spline, whereby the clamping band is stretched around said overlap region,
    whereby said linking means causes binding action to resist pull-apart motion of the pipes.

2. The invention as defined in claim 1 wherein:
    said lap portion of the outer pipe comprises a collapsible sealing ring under said clamping band whereby it is engaged in sealing relation with the inner pipe.

3. The invention as defined in claim 1 wherein:
    said clamping band comprises a single piece of sheet metal and each said sidewall is folded back on itself to provide a double layer of sheet metal.

4. The invention as defined in claim 1 wherein:
    said linking means comprises said bar.

5. The invention as defined in claim 1 wherein:
    said attachment means comprises an attachment band disposed around said inside pipe, and including second tightening means for clamping the attachment band around the inside pipe.

6. The invention as defined in claim 5 wherein:
    said attachment band has a cross-section including a roundish sector and a radially projecting channel-shaped sector, the last-mentioned channel-shaped sector comprising a pair of sidewalls extending outwardly from the roundish sector and being separated from each other at the outer ends to form an opening in the band,
    a second spline disposed between the sidewalls and having a pair of surfaces which are respectively opposite the last-mentioned pair of sidewalls, one of said surfaces of said second spline being concave,
    said bar being disposed against one of the last-mentioned sidewalls opposite said concave surface of said second spline,
    said second tightening means including at least one bolt and nut with the bolt extending laterally through said bar, last-mentioned sidewalls and second spline and being adapted to force the last-mentioned sidewalls against the respective surfaces of the second spline, whereby the attachment band is stretched around said inside pipe.

7. The invention as defined in claim 5 wherein:
    said attachment band comprises a single piece of sheet metal and each sidewall thereof is folded back on itself to provide a double layer of sheet metal.

* * * * *